(12) United States Patent
Inoue et al.

(10) Patent No.: US 7,729,405 B2
(45) Date of Patent: Jun. 1, 2010

(54) COMMUNICATION DEVICE AND COMMUNICATION METHOD

(75) Inventors: Hiroto Inoue, Shinagawa (JP); Shigemi Kurashima, Shinagawa (JP); Takuya Uchiyama, Shinagawa (JP)

(73) Assignee: Fujitsu Component Limited, Tokyo (JP)

( * ) Notice: Subject to any disclaimer, the term of this patent is extended or adjusted under 35 U.S.C. 154(b) by 1227 days.

(21) Appl. No.: 11/019,239

(22) Filed: Dec. 23, 2004

(65) Prior Publication Data

US 2005/0141595 A1 Jun. 30, 2005

(30) Foreign Application Priority Data

Dec. 26, 2003 (JP) ............................. 2003-435279

(51) Int. Cl.
*H04B 1/00* (2006.01)
(52) U.S. Cl. ................... 375/130; 375/136; 375/145; 375/147; 375/149; 375/150
(58) Field of Classification Search ................. 375/130, 375/136, 145, 147, 149, 150
See application file for complete search history.

(56) References Cited

U.S. PATENT DOCUMENTS

| 4,124,817 A | * | 11/1978 | Takahashi | 455/205 |
|---|---|---|---|---|
| 4,280,221 A | * | 7/1981 | Chun et al. | 375/288 |
| 5,687,200 A | * | 11/1997 | Berger | 375/363 |
| 5,946,120 A | * | 8/1999 | Chen | 398/155 |
| 6,959,031 B2 | * | 10/2005 | Haynes et al. | 375/130 |
| 6,967,993 B1 | * | 11/2005 | Miller | 375/150 |
| 7,079,604 B1 | * | 7/2006 | Miller et al. | 375/343 |
| 2001/0048382 A1 | * | 12/2001 | Low et al. | 341/157 |
| 2003/0147480 A1 | * | 8/2003 | Richards et al. | 375/343 |
| 2003/0227984 A1 | * | 12/2003 | Batra et al. | 375/340 |
| 2004/0214522 A1 | * | 10/2004 | Santhoff et al. | 455/12.1 |

FOREIGN PATENT DOCUMENTS

JP 2003-234691 8/2003

* cited by examiner

*Primary Examiner*—Shuwang Liu
*Assistant Examiner*—Kenneth Lam

(57) ABSTRACT

A communication device performs a radio communication in an ultra wideband with the use of the impulse radio system. The communication device includes a receiver. The receiver is equipped with antennas, a correlation circuit, and a CPU. The antennas receive send signals from a transmitter. The correlation circuit detects a synchronization pulse having a longer cycle than a highly redundant data pulse among received signals. The CPU performs a synchronization process based on the synchronization pulse. The CPU establishes a channel based on the synchronization pulse, and selectively changes the antennas according to the received signal. In the case where the receive signal has not been received for a given period of time after the synchronization is established correlation signals is stopped outputting to start a polling signal. The correlation signals are output to obtain correlation of the receive signals.

11 Claims, 7 Drawing Sheets

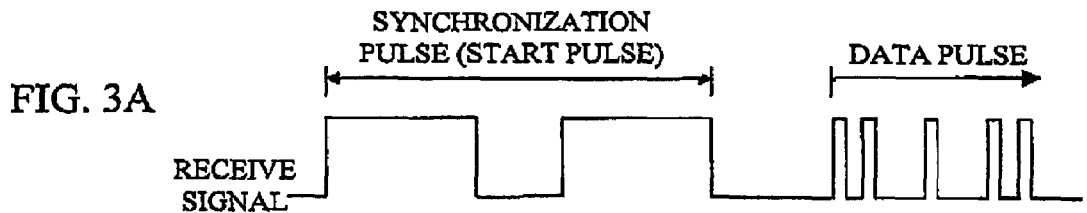# 
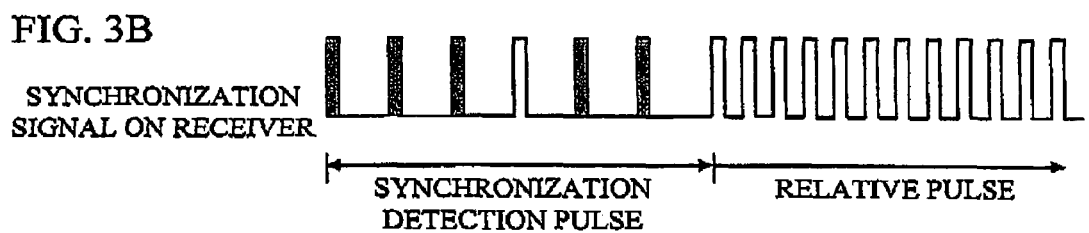
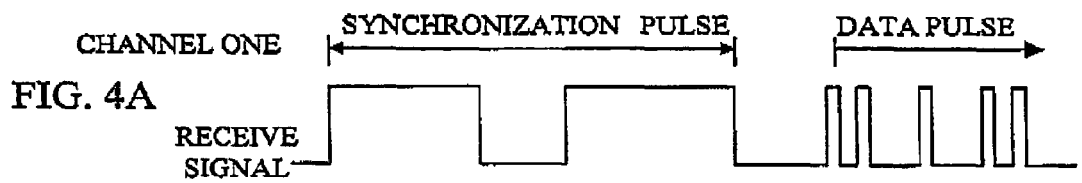
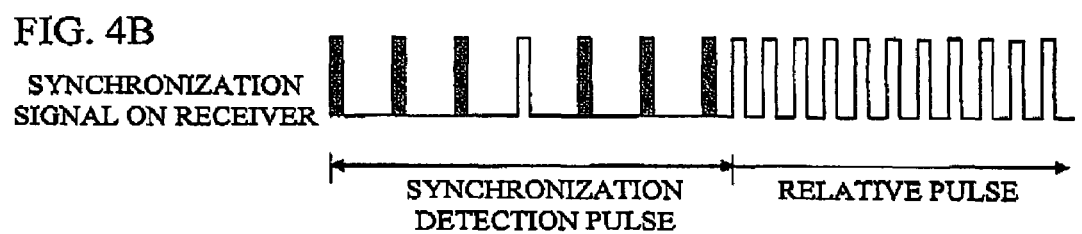
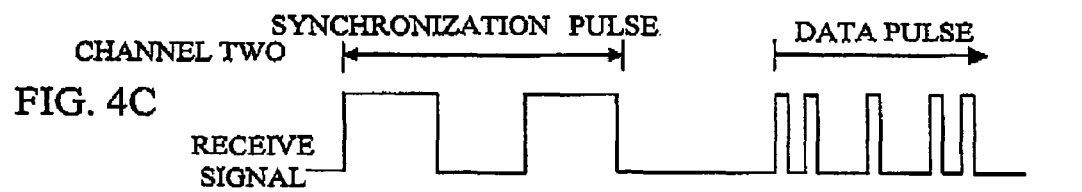
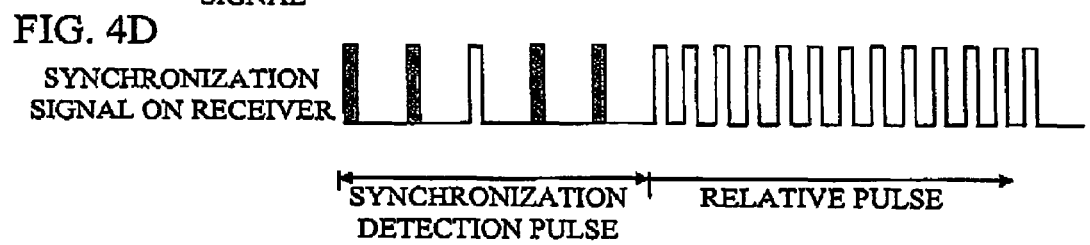

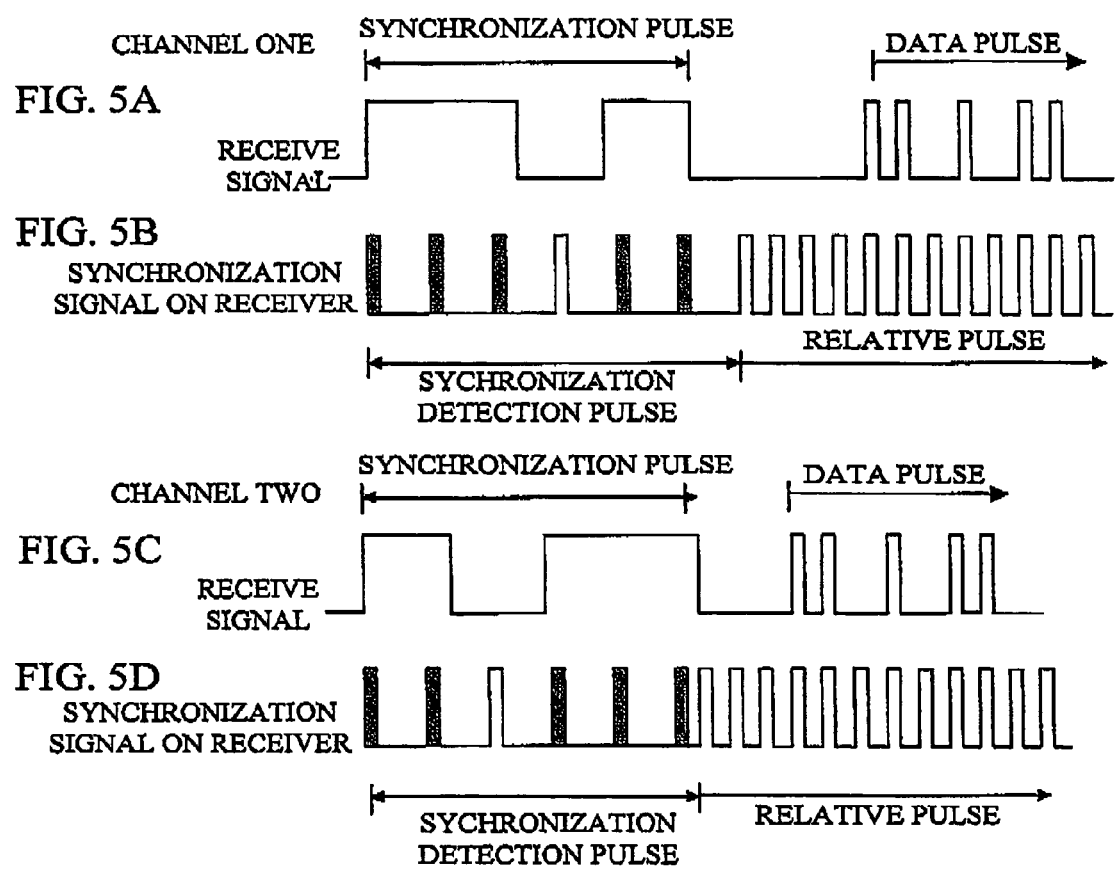

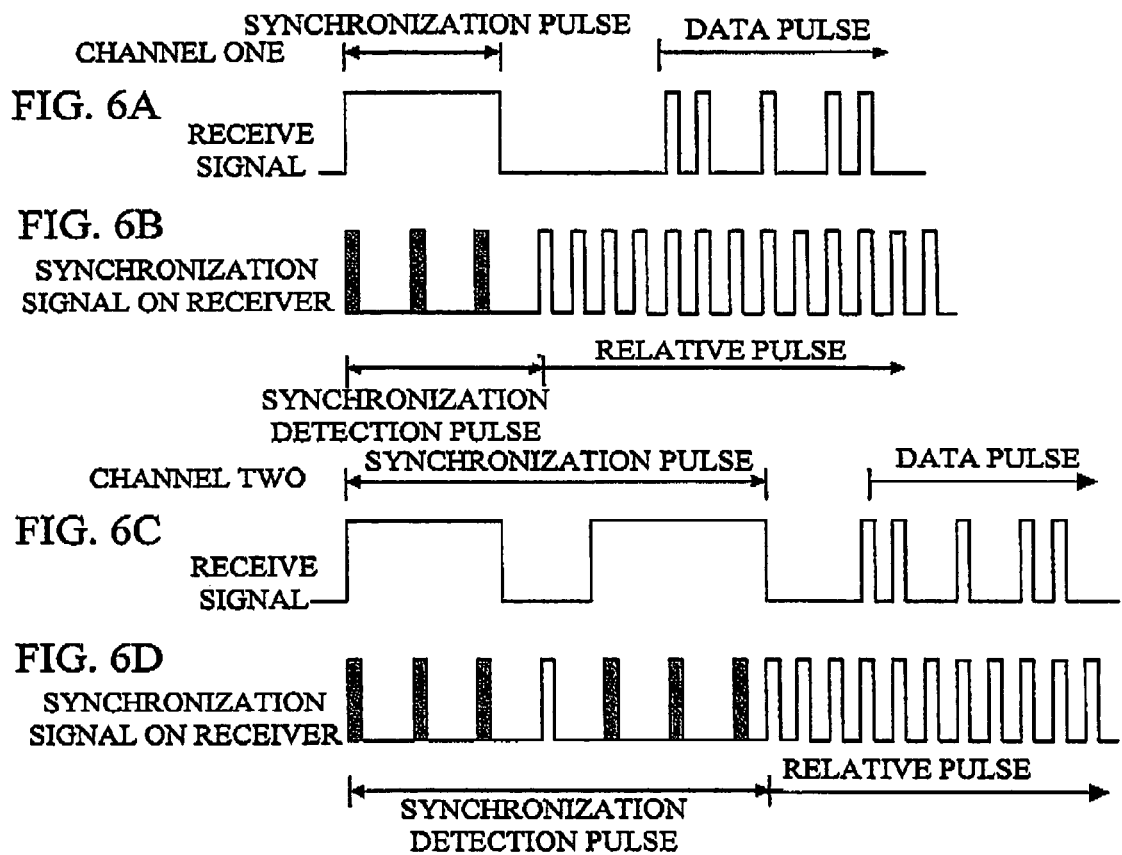

COMMUNICATION DEVICE AND COMMUNICATION METHOD

BACKGROUND OF THE INVENTION

1. Field of the Invention

This invention generally relates to a communication device and communication method.

2. Description of the Related Art

Recently, a high-speed wireless transmission technology has been studied and developed, one of which is a method called UWB (Ultra Wide Band). The UWB utilizes at least 20 percent of fractional bandwidth or at least 500 MHz of ultra high bandwidth. The UWB is a wireless communication method that can realize a high-speed data transmission by sending and receiving data that are spread in an extremely high frequency range, at least 500 MHz.

The UWB communicates with the use of a signal train or signal sequence. An information signal is composed of an impulse signal train that has an extremely short cycle of several hundred picoseconds. An occupied frequency range is extremely wide, as compared to the frequency range that is usually used in a wireless LAN. However, there is a problem in that it is difficult to establish the synchronization of data and a relative signal so as to obtain correlation of data in an impulse radio system, which transmits ultra short pulses without carriers, among radio communication systems of ultra wideband such as the UWB. Japanese Patent Application Publication No. 2003-234691 (hereinafter referred to as Document 1) has been proposed to solve the aforementioned problem as the conventional technique.

The wireless communication system disclosed in Document 1 is equipped with a timing generation device, which transmits a standard pulse signal at certain intervals. A wireless network is established with wireless communication devices, which exist within a range that the standard pulse signal reaches.

The wireless communication system described in Document 1 is equipped with the timing generation device that transmits a standard pulse signal at certain intervals so as to synchronize the standard pulse signal with a transmit and receive circuit. Here, it is to be noted that an additional external device such as the timing generation device is costly.

Besides, there is another problem in that, with the impulse radio system, it is difficult to eliminate the affects caused resulting from noises and also difficult to extract desired signals only, when the signals are received and the data is extracted.

SUMMARY OF THE INVENTION

The present invention has been made in view of the above circumstances and provides a communication device and communication method that can extract the desired signal so as to establish synchronization without using an additional external device.

According to an aspect of the present invention, preferably, there is provided a communication device that performs wireless communication in an ultra wide band with the use of an impulse radio system includes an antenna that receives transmit signals from a transmitter, a synchronization pulse detection unit that detects a synchronization pulse having a longer cycle than that of a highly redundant data pulse, in the transmit signals that have been received from the antenna, and a synchronization process unit that performs a synchronization process based on the synchronization pulse. The synchronization process is conducted after detecting the synchronization pulse having a longer cycle than that of the highly redundant data pulse. It is thus possible to extract the desired signals for establishing the synchronization without using an additional external device.

According to another aspect of the present invention, preferably, there is provided a communication device that performs wireless communication in an ultra wide band with the use of an impulse radio system includes an antenna that receives transmit signals from a transmitter, a synchronization pulse detection unit that detects a synchronization pulse included in a pulse train in the transmit signals that have been received from the antenna, the pulse train being determined by a nonlinear function, and a synchronization process unit that performs a synchronization process based on the synchronization pulse.

It is thus possible to extract the desired signals for establishing the synchronization without using an additional external device. In addition, by employing the nonlinear function, any peripheral communication devices are not capable of detecting the above-mentioned synchronization pulse. This makes it possible to avoid cross talk. Here, the term nonlinear denotes that it is not a linear. The linear satisfies a superposition principle between cause and effect.

On the above-mentioned communication, may further include a channel establishment unit that establishes a channel by confirming a difference in cycles of the synchronization pulse. The channel is established between the transmitter and the receiver with differences in the synchronization pulses. The channel is easily established without using the additional external device. It is thus possible to avoid the cross talk even if there are a number of communication devices that exist within coverage.

On the above-mentioned communication, may further include a channel establishment unit that establishes a channel by confirming a difference in cycle patterns of the synchronization pulse. The channel is established with the differences in the synchronization pattern of the synchronization pulses. The channel is easily established between the transmitter and the receiver without using the additional external device. It is thus possible to avoid the cross talk even if there are a number of communication devices that exist within coverage.

On the above-mentioned communication, may further include a channel establishment unit that establishes a channel by confirming a difference in the number of the synchronization pulses. The channel is easily established between the transmitter and the receiver without using the additional external device. It is thus possible to establish the channel easily without using the additional external device.

On the above-mentioned communication, may further include a channel establishment unit that establishes a channel by confirming a difference in nonlinear functions of the synchronization pulse included in a pulse train that has been determined by the nonlinear function. The channel is established between the transmitter and the receiver with differences in the synchronization pulse train that is determined by the nonlinear function. It is thus possible to establish the channel easily without using the additional external device.

On the above-mentioned communication, may further include a switching unit that selectively changes a narrow band antenna and a wide band antenna according to a receive signal, and the antenna includes the narrow band antenna and the wide band antenna. Before the channel establishment, the frequency range for transmission is limited with the narrowband antenna, and after the channel establishment, the data is received by the wideband antenna without limiting the frequency range for transmission. It is thus possible to adapt the channel between the transmitter and the receiver.

On the above-mentioned communication, may further include a control unit that stops outputting correlation signals to obtain correlation of the receive signal and starts sending polling signals to wait for the synchronization pulse, if the receive signal has not been received for a given period after a synchronization establishment. It is thus possible to reduce the power consumed.

According to another aspect of the present invention, preferably, there is provided a communication device that performs wireless communication in an ultra wide band with the use of an impulse radio system includes a synchronization pulse generation unit that generates synchronization pulses having longer cycles than those of highly redundant data pulses, and an antenna that transmits the synchronization pulses. By transmitting the synchronization pulses having longer cycles than those of highly redundant data pulses, it is possible to establish the synchronization after extracting the desired signals, without an additional external device such as a timing generation device.

According to another aspect of the present invention, preferably, there is provided a communication device that performs wireless communication in an ultra wide band with the use of an impulse radio system includes a synchronization pulse generation unit that generates synchronization pulses included in a pulse train that has been determined by a nonlinear function, and an antenna that transmits the synchronization pulses. By transmitting the synchronization pulse composed of the pulse train that is determined by the nonlinear function, it is possible to establish the synchronization after extracting the desired signals, without an additional external device such as a timing generation device. By employing the nonlinear function, the peripheral devices are not capable of detecting the synchronization pulse. It is thus possible to avoid the cross talk.

On the above-mentioned communication, may further include the synchronization pulse generation unit generates the synchronization pulses having a cycle according to a channel to be established. When the channel is established between the transmitter and the receiver, the synchronization pulse having a cycle according to the channel. It is thus possible to establish the channel easily without an additional external device such as the timing generation device.

On the above-mentioned communication, may further include the synchronization pulse generation unit generates the synchronization pulses having a cycle pattern according to a channel to be established. The synchronization pulse having the cycle pattern is generated according to the channel established between the transmitter and the receiver. It is thus possible to establish the channel easily without an additional external device such as the timing generation device.

On the above-mentioned communication, may further include, and the synchronization pulse generation unit generates the synchronization pulses having the number of pulses according to a channel to be established. The synchronization pulse having the number of the pulses is generated according to the channel established between the transmitter and the receiver. It is thus possible to establish the channel easily without an additional external device such as the timing generation device.

On the above-mentioned communication, may further include the synchronization pulse generation unit generates the synchronization pulses included in a pulse train that has been determined by a nonlinear function, according to a channel to be established. The synchronization pulse having the pulse train determined by the nonlinear function is generated according to the channel established between the transmitter and the receiver. It is thus possible to establish the channel easily without an additional external device such as the timing generation device.

On the above-mentioned communication, may further include a switching unit that selectively changes a narrow band antenna and a wide band antenna according to a transmit signal, and the antenna includes the narrow band antenna and the wide band antenna. Before the channel establishment, the frequency range for transmission is limited with the narrowband antenna, and after the channel establishment, the data is received by the wideband antenna without limiting the frequency range for transmission. It is thus possible to adapt the channel between the transmitter and the receiver.

According to another aspect of the present invention, preferably, there is provided a communication method that performs wireless communication in an ultra wide band with the use of an impulse radio system comprising the steps of receiving transmit signals from a transmitter, detecting a synchronization pulse having a longer cycle than that of a highly redundant data pulse, in the transmit signals that have been received from the antenna, and synchronizing based on the synchronization pulse. By transmitting the synchronization pulses having longer cycles than those of highly redundant data pulses, it is possible to establish the synchronization after extracting the desired signals, without an additional external device such as the timing generation device.

According to another aspect of the present invention, preferably, there is provided a communication method that performs wireless communication in an ultra wide band with the use of an impulse radio system comprising the steps of receiving transmit signals from a transmitter, detecting a synchronization pulse included in a pulse train in the transmit signals that have been received from the antenna, the pulse train having been determined by a nonlinear function, and synchronizing based on the synchronization pulse. The synchronization process is performed after detecting the synchronization pulse that is composed of the pulse train determined by the nonlinear function among the transmit signals. It is thus possible to extract the desired signals and establish the synchronization without an additional external device. By employing the nonlinear function, any peripheral communication devices are not capable of detecting the above-mentioned synchronization pulse. This makes it possible to avoid cross talk.

According to another aspect of the present invention, preferably, there is provided a communication method that performs wireless communication in an ultra wide band with the use of an impulse radio system comprising the steps of generating synchronization pulses having linger cycles than those of highly redundant data pulses, and transmitting the synchronization pulses. By transmitting the synchronization pulses having longer cycles than those of highly redundant data pulses, it is possible to extract the desired signals without an additional external device such as the timing generation device.

According to another aspect of the present invention, preferably, there is provided a communication device that performs wireless communication in an ultra wide band with the use of an impulse radio system comprising the steps of generating synchronization pulses included in a pulse train that has been determined by a nonlinear function, and transmitting the synchronization pulses. By transmitting the synchronization pulses included in a pulse train that has been determined by a nonlinear function, it is possible to extract the desired signals without an additional external device such as the timing generation device.

BRIEF DESCRIPTION OF THE DRAWINGS

A Preferred embodiment of the present invention will be described in detail with reference to the following drawings, wherein:

FIGS. 3A and 3B illustrate an example of a receive signal on the receiver;

FIGS. 4A through 4D illustrate other examples of a channel establishment;

FIGS. 5A through 5D illustrate other examples of the channel establishment:

FIGS. 6A through 6D illustrate still other examples of the channel establishment;

FIG. 7 illustrates communication bands used for a wide-band communication system and narrow-band antennas;

DESCRIPTION OF THE PREFERRED EMBODIMENTS

A description will now be given, with reference to the accompanying drawings, of an embodiment of the present invention.

Figure 1:
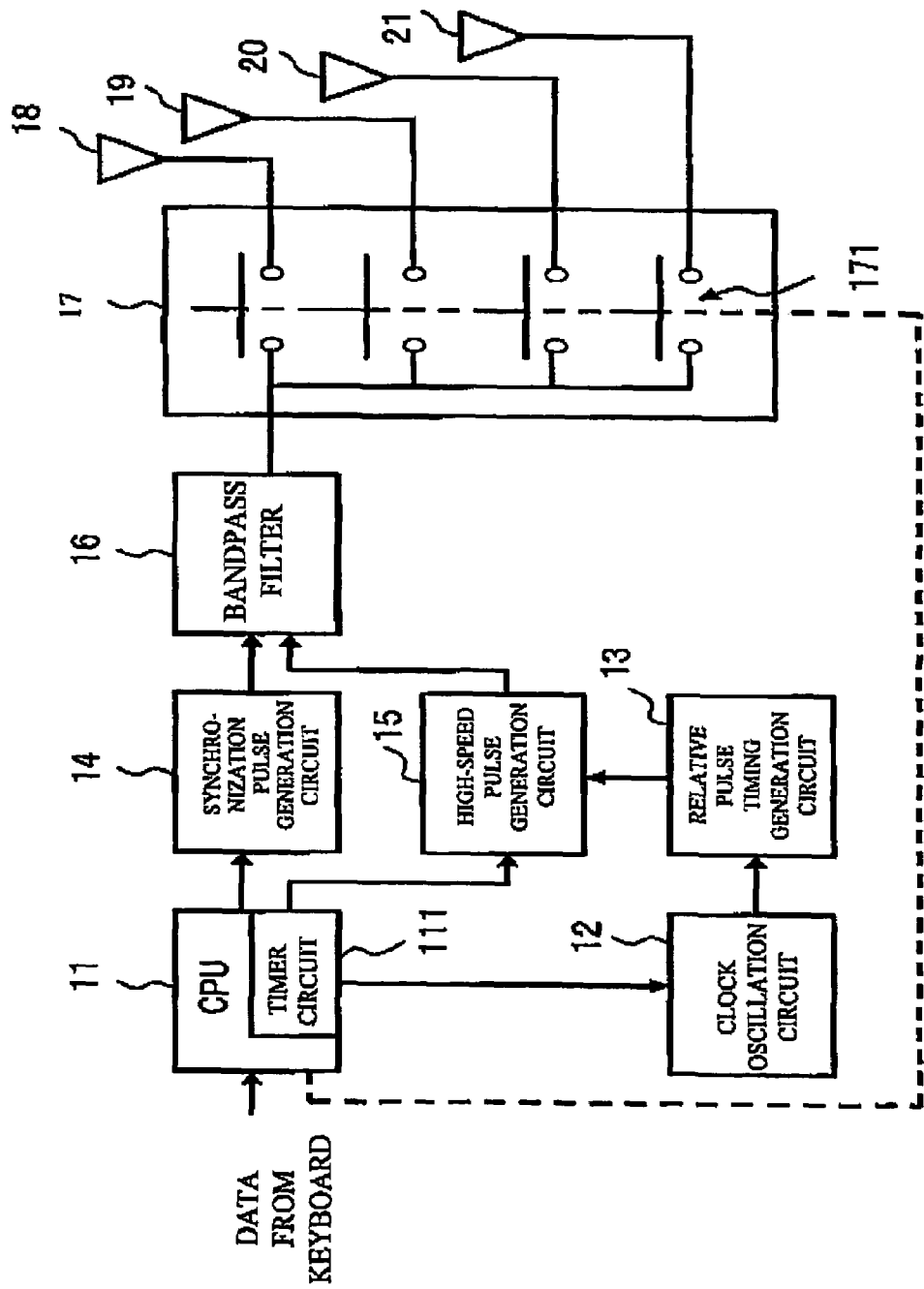
FIG. 1 shows a connection example of a switching device in accordance with the embodiment of the present invention.

First, a description will be given of a transmitter, FIG. 1 is a block diagram of the transmitter in accordance with the embodiment of the present invention. Referring to FIG. 1, a transmitter 10 includes a CPU 11, a clock oscillation circuit 12, a relative pulse timing generation circuit 13, a synchronization pulse generation circuit 14, a high-speed pulse generation circuit 15, a bandpass filter 16, an antenna array circuit 17, an antenna 18 for a first channel, an antenna 19 for a second channel, an antenna 20 for a third channel, and an antenna 21 for covering the entire frequency range.

The transmitter 10 is a communication device that utilizes the impulse radio system to perform radio communication in the ultra wide frequency range. Under the overall control by the CPU 11, information and telecommunication can be realized between the transmitter 10 and a receiver 40. The transmitter 10 transmits a highly redundant and long-cycled synchronization pulse, which is a start pulse, to the receiver 40. It is enough, if this highly redundant and long-cycled synchronization pulse is longer than a data pulse. The receiver 40 carries out a synchronization process according to the above-mentioned highly redundant and long-cycled synchronization pulse. The transmitter 10 may send a pulse train as synchronization pulses to the receiver 40, instead of the highly redundant and long-cycled synchronization pulse. The pulse train is determined by a nonlinear function. The receiver 40 performs the synchronization process according to the pulse train determined by above-mentioned nonlinear function.

The CPU 11 includes a timer circuit 111, and controls a device operation concerning the radio communication by executing operation procedure instructions, which are program codes. The operation procedure instructions are stored in an information memory unit, which is not shown. The CPU 11 controls the sending of data provided by a device such as the keyboard or the like, to the receiver 40. The data sent by the transmitter 10 may include any type of data.

The clock oscillation circuit 12 generates a clock pulse referring to the timer circuit 111 on the CPU 11, and feeds the clock pulse to the relative pulse timing generation circuit 13. The relative pulse timing generation circuit 13 generates the relative pulse signal according to the clock signal from the clock oscillation circuit 12, and outputs the relative pulse signal to the high-speed pulse generation circuit 15.

The synchronization pulse generation circuit 14 generates synchronization pulse signals to form the pulse train, according to the instruction from the CPU 14. The pulse train is determined by the synchronization pulse signal that has a longer cycle than the highly redundant data pulse or the nonlinear function. In the case where a channel is established between the transmitter and the receiver with these synchronization pulses, the synchronization pulse generation circuit 14 generates the synchronization pulses according to the instruction from the CPU 11. The above-mentioned synchronization pulses include the synchronization pulse having a cycle corresponding to the channel established between the transmitter and the receiver, the synchronization pulse having a cycle pattern corresponding to the channel established between the transmitter and the receiver, the synchronization pulse having the number of pulses corresponding to the channel established between the transmitter and the receiver, or the synchronization pulse is included in the pulse train determined by the nonlinear function corresponding to the channel established between the transmitter and the receiver.

The high-speed pulse generation circuit 15 generates a data pulse signal based on the relative pulse signal from the relative pulse timing generation circuit 13 and a data signal from the CPU 11. This data pulse signal is sent after the synchronization pulse signal. The bandpass filter 16 eliminates undesired signals from the synchronization pulse signals generated by the synchronization pulse generation circuit 14 and the data pulse signal generated by the high-speed pulse generation circuit 15 so as to form a transmit signal. The bandpass filter 16 emits the transmit signal in the air to feed into the antennas 18 through 21.

The antenna 18 for the first channel, the antenna 19 for the second channel, and the antenna 20 for the third channel are narrow-band channels. The narrow-band channels are used for sending a small amount of information such as the synchronization pulse, channel establishment, or the like. The antenna for covering the entire frequency range 21 covers all frequency ranges and is used for sending a high-speed and large amount of information such as data. The antenna for covering the entire frequency range 21 corresponds to a wide-band antenna.

The antenna array circuit 17 is equipped with an antenna selector switch 171. The antenna array circuit 17 is capable of selecting from four antennas with the antenna selector switch 171 based on the instruction from the CPU 11 so that wireless communication may be carried out. The four antennas include the antenna 18 for the first channel, the antenna 19 for the second channel, the antenna 20 for the third channel, and the antenna 21 for covering the entire frequency range. The CPU 11 selectively changes the antenna with the antenna selector switch 171 according to the signal to be transmitted. Before the channel is established, the CPU 11 selects the narrow-band antennas 18 through 20 to limit the frequency range for transmission. After the channel establishment, the CPU 11 selects the antenna for covering the entire frequency range 21 to send the high-speed and large amount of information such as data.

CPU 11 corresponds to a switching unit. The synchronization pulse generation circuit 14 corresponds to a synchronization pulse generation unit.

Figure 2:
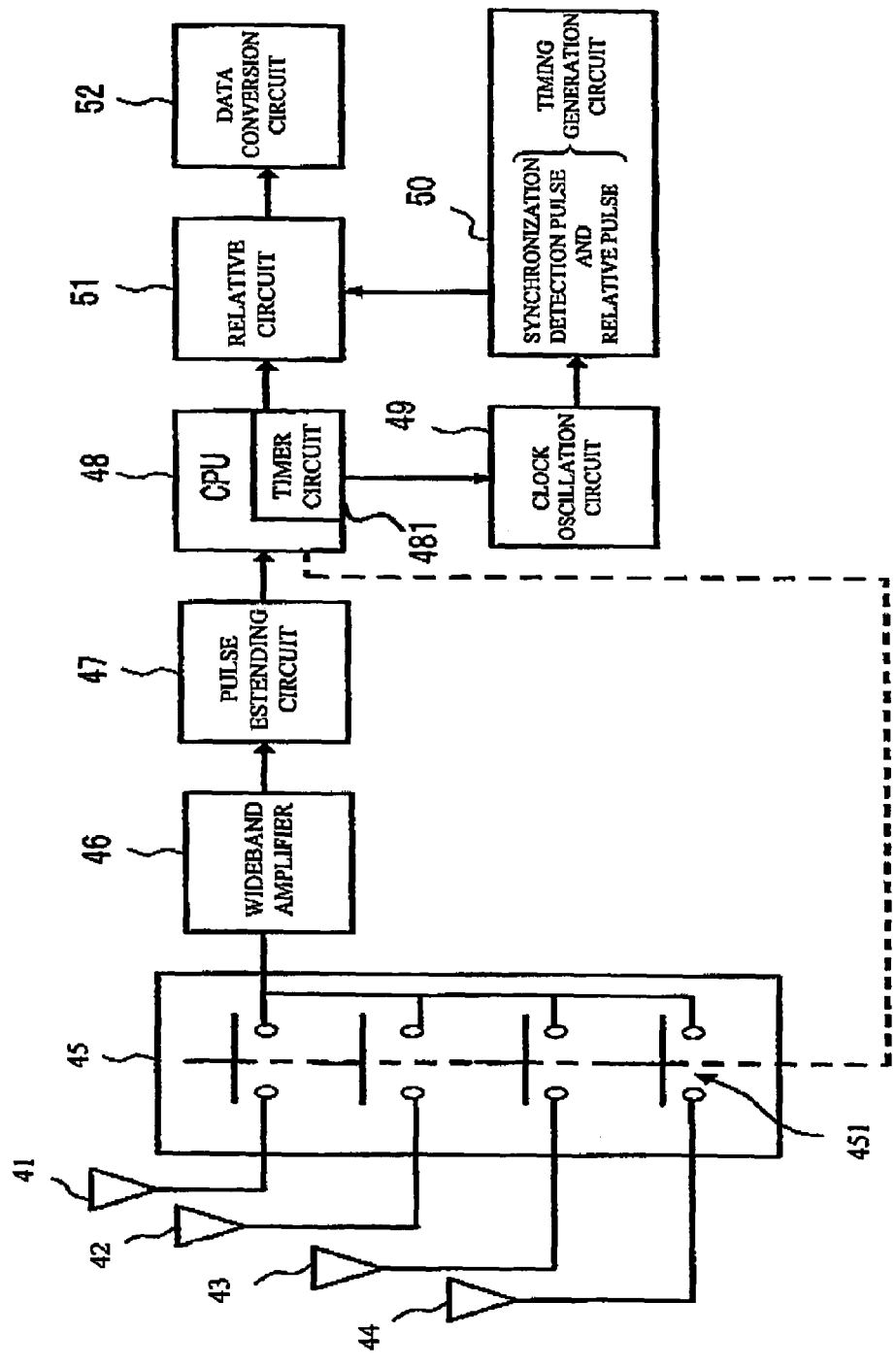
FIG. 2 is a block diagram of a receiver in accordance with the embodiment of the present invention.

Next, a description will be given of the receiver 40. FIG. 2 is a block diagram of the receiver 40 in accordance with the embodiment of the present invention. Referring to FIG. 2, the receiver 40 includes an antenna 41 for a first channel, an antenna 42 for a second channel, an antenna 43 for a third channel, an antenna 44 for covering the entire frequency range, an antenna array circuit 45, a wideband amplifier 46, a pulse extending circuit 47, a CPU 48, a clock oscillation circuit 49, a timing generation circuit 50, a correlation circuit 51, and a data conversion circuit 52.

The receiver 40 is a communication device that performs wireless communication in the ultra wideband frequency range with the use of the impulse radio system. The receiver 40 receives receive signals including the synchronization pulse and the data pulse from the transmitter 10. The antenna 41 for the first channel, the antenna 41 for the second channel, the antenna 43 for the third channel are narrow-band channels that are used for sending a small amount of information such as the channel establishment or the like. The antenna for covering the entire frequency range 44 covers all frequency ranges and is used for sending the high-speed and large amount of information such as data. The antenna for covering the entire frequency range 44 corresponds to the wideband antenna.

The antenna array circuit 45 is equipped with an antenna selector switch 451. The CPU 48 selectively changes the antenna, with the antenna selector switch 451 according to the receive signal. Before the channel is established, the CPU 48 selects the narrow-band antennas 41 through 43 to limit the frequency range for receiving. After the channel establishment, the CPU 48 selects the antenna for covering the entire frequency range 44 to receive the high-speed and large amount of information such as data. The wideband amplifier 46 amplifies the receive signals.

The pulse extending circuit 47 extends the pulse of the receive signal that has been amplified by the wideband amplifier 46. The CPU 48 controls the device operation concerning the radio communication by executing operation procedure instructions, which are program codes. The operation procedure instructions are stored in the information memory unit, which is not shown. The CPU 48 is equipped with a timer circuit 481. The CPU 48 performs the synchronization process based on the synchronization pulse. The CPU 48 establishes the channel between the transmitter and the receiver according to the synchronization pulse, as will be described later in detail. After the synchronization is established, if the CPU 48 has not received the receive signal for a give period of time, the CPU 48 stops sending the relative pulse signal emitted from the timing generation circuit 50 so as to obtain correlation of the receive signals, and starts sending a polling signal awaiting the synchronization pulse.

The clock oscillation circuit 49 generates the clock pulse referring to the timer circuit 481. The timing generation circuit 50 generates a synchronization detection pulse signal and the relative pulse signal based on the clock signal outputted from the clock oscillation circuit 49, and applies the above-mentioned pulse signals to the correlation circuit 51.

The correlation circuit 51 detects the synchronization of the synchronization pulse and a synchronization detection pulse. The synchronization pulse has a longer cycle than the highly redundant data pulse or is included in the pulse train determined by the nonlinear function. The correlation circuit 51 decodes the received data based on the relative pulse signal applied from the timing generation circuit 50. The data conversion circuit 52 converts the received data into a given format.

The CPU 48 corresponds to a synchronization process unit, a channel establishment unit, a channel selection unit, and a channel control unit. The correlation circuit 51 corresponds to a synchronization pulse detection unit.

Next, a description will be given of a synchronization detection process of the receiver 40. FIG. 3A illustrates an example of the receive signal on the receiver. FIG. 3B illustrates an example of the synchronization signal on the receiver. In FIGS. 3A and 3B, a description will be given of an example that uses the synchronization pulse having a longer cycle than that of the highly redundant data pulse, which is located before a transmit data.

If the receiver 40 receives the synchronization pulse, the timing generation circuit 50 outputs the synchronization detection pulse to confirm the correlation of the synchronization pulse and the synchronization detection pulse. If the correlation circuit 51 confirms the synchronization "n" times in a row, the timing generation circuit 50 emits the relative pulse in synchronization with a down edge of the synchronization pulse. The correlation circuit 51 reads the data with the relative pulse. This makes it possible to extract desired signals and establish the synchronization without an additional external device such as the timing generation device or the like. As shown in FIGS. 3A and 3B, the example of the synchronization pulse having a longer cycle than that of the highly-redundant data pulse has been described as the synchronization pulse. The synchronization pulse, which is included in the pulse train determined by the nonlinear function, however, may be used for the synchronization pulse.

Next, a description will be given of the channel establishment between the transmitter and the receiver. FIG. 4A shows the receive signals for the first channel. FIG. 4B shows the synchronization signals on the receiver for the first channel. FIG. 4C shows the receive signals for the second channel. FIG. 40 shows the synchronization signals on the receiver for the second channel. A description will be given of an example of the channel establishment between the transmitter and the receiver having different synchronization pulse cycles.

Referring to FIG. 43, if the CPU 48 confirms that the correlation circuit 51 obtains correlation with the synchronization pulse three times in a row, the CPU 48 selectively changes to the antenna 41 for the first channel so as to establish the first channel, with the antenna selector switch 451. Referring to FIG. 4D, if the CPU 48 confirms that the correlation circuit 51 obtains correlation with the synchronization pulse twice in a row, the CPU 48 selectively changes to the antenna 42 for the second channel so as to establish the second channel, with the antenna selector switch 451. It is thus possible to establish the channel due to the difference in the synchronization pulse cycle, and thereby possible to establish the channel readily without using the additional external device such as the timing generation circuit or the like.

Next, other examples of the channel establishment will be described. FIGS. 5A through 5C illustrate the other examples of the channel establishment. FIG. 5A shows the receive signal of the first channel. FIG. 5B shows the synchronization signal on the receiver of the first channel. FIG. 5C shows the receive signal of the second channel. FIG. 5D shows the synchronization signal on the receiver of the second channel. Referring to FIGS. 5A through 5D, a description will be given of examples of establishing the channel between the transmitter and the receiver with the difference in the cycle pattern of the synchronization pulse.

As shown in FIG. 5B, if the CPU 48 confirms that the correlation circuit 51 obtains correlation with the synchronization pulse three times in a row, and further obtains the correlation with the synchronization pulse twice in a row, the CPU 48 selectively changes to the antenna 41 for the first channel so as to establish the first channel, with the antenna selector switch 451. As shown in FIG. 5D, if the CPU 48 confirms that the correlation circuit 51 obtains correlation with the synchronization pulse twice in a row, and further obtains the correlation with the synchronization pulse three times in a row, the CPU 48 selectively changes to the antenna 42 for the second channel so as to establish the second channel, with the antenna selector switch 451. It is thus possible to establish the channel due to the difference in the cycle pattern of the synchronization pulse, and thereby possible to establish the channel readily without using the additional external device such as the timing generation circuit or the like.

Next, a description will be given of other examples of the channel establishment. FIGS. 6A through 6D illustrate other examples of the channel establishment. FIG. 6A shows the receive signal of the first channel. FIG. 6B shows the synchronization signal on the receiver of the first channel. FIG. 6C shows the receive signal of the second channel. FIG. 6D shows the synchronization signal on the receiver of the second channel. Referring to FIGS. 6A through 6D, a description will be given of examples of establishing the channel between the transmitter and the receiver with the difference in the number of the synchronization pulses.

As shown in FIG. 6B, if the CPU 48 confirms that the correlation circuit 51 obtains correlation with the synchronization pulse three times in a row, the CPU 48 selectively changes to the antenna 41 for the first channel so as to establish the first channel, with the antenna selector switch 451. As shown in FIG. 6D, if the CPU 48 confirms that the correlation circuit 51 obtains correlation with the synchronization pulse three times in a row, and further obtains three times in a row, the CPU 48 selectively changes to the antenna 42 for the second channel so as to establish the second channel, with the antenna selector switch 451. It is thus possible to establish the channel due to the difference in the number of the synchronization pulses, and thereby possible to establish the channel readily without using the additional external device such as the timing generation circuit or the like. The CPU 48 may establish the channel between the transmitter and the receiver due to the difference in the function of the pulse train determined by the nonlinear function, which is not shown.

FIG. 7 illustrates communication bands used for a wideband communication system and the narrow-band antennas 18 through 20 and 41 through 43. The wideband can be obtained by joining the narrow bands. The antenna array circuits 17 and 45 selectively changes the narrow-band antennas 18 through 20 and 41 through 43 and antennas for covering the entire frequency range 21 and 44, with the antenna selector switches 171 and 451, according to the instruction of the CPU 11 or the CPU 48.

The receiver 40 waits in a state that can receive the data in the frequency range for the first channel only, if the channel one is supposed to be used. The receiver 40 waits in a state that can receive the data in the frequency range for the second channel only, if the second channel is supposed to be used. The transmitter 10 transmits the data in a frequency range for the first channel, if the transmitter 10 transmits to the receiver 40 in the first channel. Therefore, the data cannot be received by the receiver in the second channel. When the receiver 40 receives the channel signal, the receiver 40 changes to the antenna for covering the entire frequency range 44 with the antenna selector switch 451 so as to receive the data.

Figure 8:
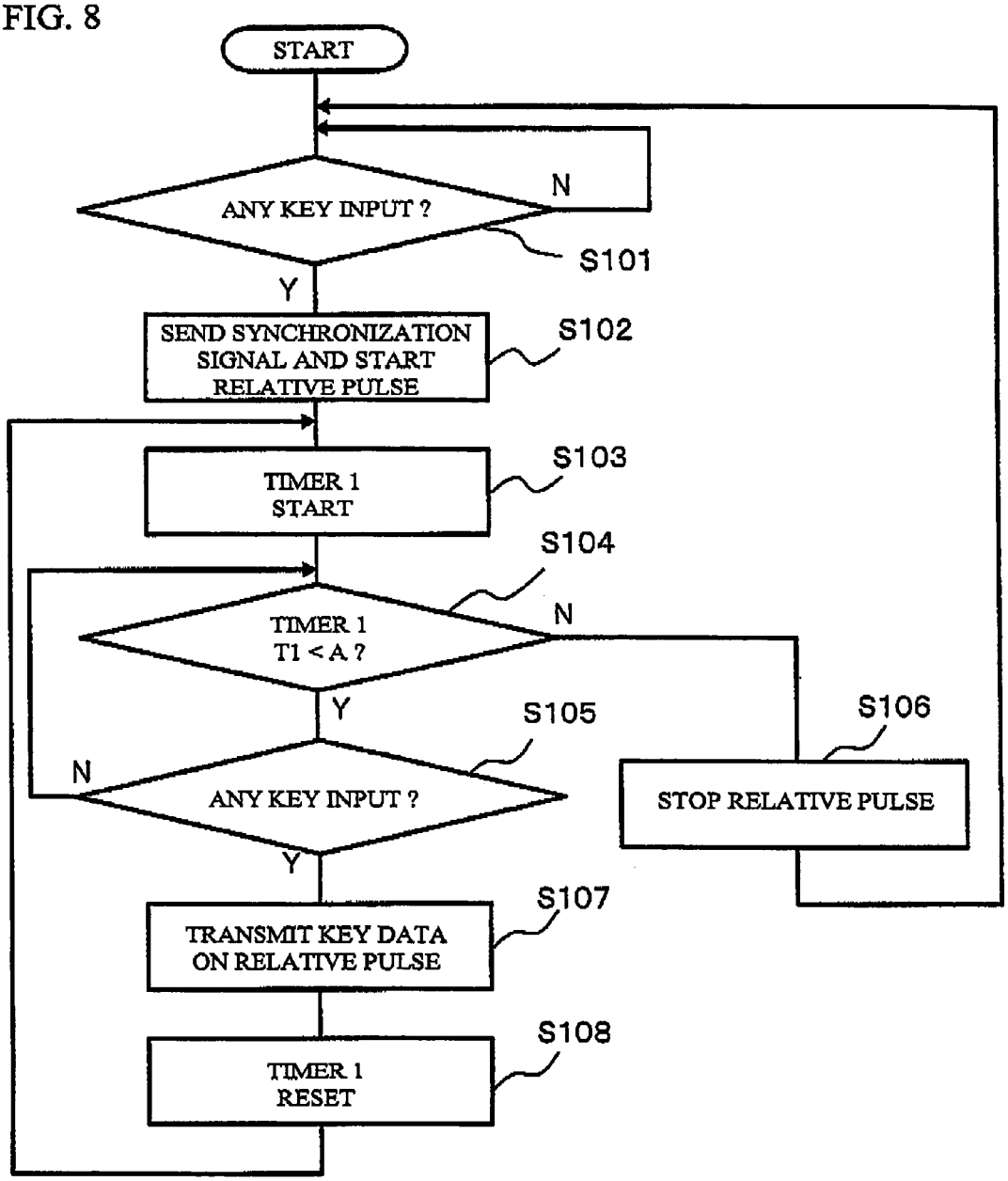
FIG. 8 is a flowchart describing the operation of the transmitter.

Next, a description will be given of an operation of the transmitter 10. FIG. 8 is a flowchart describing the operation of the transmitter. A description will be given of a case where the transmitter 10 sends data of a keyboard. In step S101, the CPU 11 determines whether there is any key input from the keyboard. If there is a key input from the keyboard in step S101, the CPU 11 generates the synchronization pulse having a longer cycle than that of the highly redundant data pulse on the synchronization pulse generation circuit 14, starts generating the relative pulse on the relative pulse timing generation circuit 13, eliminates the undesired signals from the synchronization pulse on the bandpass filter 16, and sends the data with the antennas 18 through 20. Thus, the synchronization pulse having a longer cycle than that of the highly redundant data pulse is transmitted. The synchronization pulse generation circuit 14 generates the synchronization pulse according to the channel when the channel is established between the transmitter and the receiver.

The CPU 11 starts a timer 1 in step S103. In step S104, if a time T1 of the timer 1 is smaller than A (T1<A is satisfied), that is, if the time T1 of the timer 1 has not passed a given period of time, the CPU 11 determines whether there is any key input in step S105. If there is a key input, go to step S107 to send the key data together with the relative pulse generated by the high-speed pulse generation circuit 15 via the antenna for covering the entire frequency range 21. In step S108, the timer 1 is reset and go back to step S103. In step S104, if a time T1 of the timer 1 is not smaller than A (T1<A is not satisfied), that is, if the time T1 of the timer 1 has passed a given period of time, go to step S106 to stop generating the relative pulse on the relative pulse timing generation circuit 13 and then go back to step S101.

Figure 9:
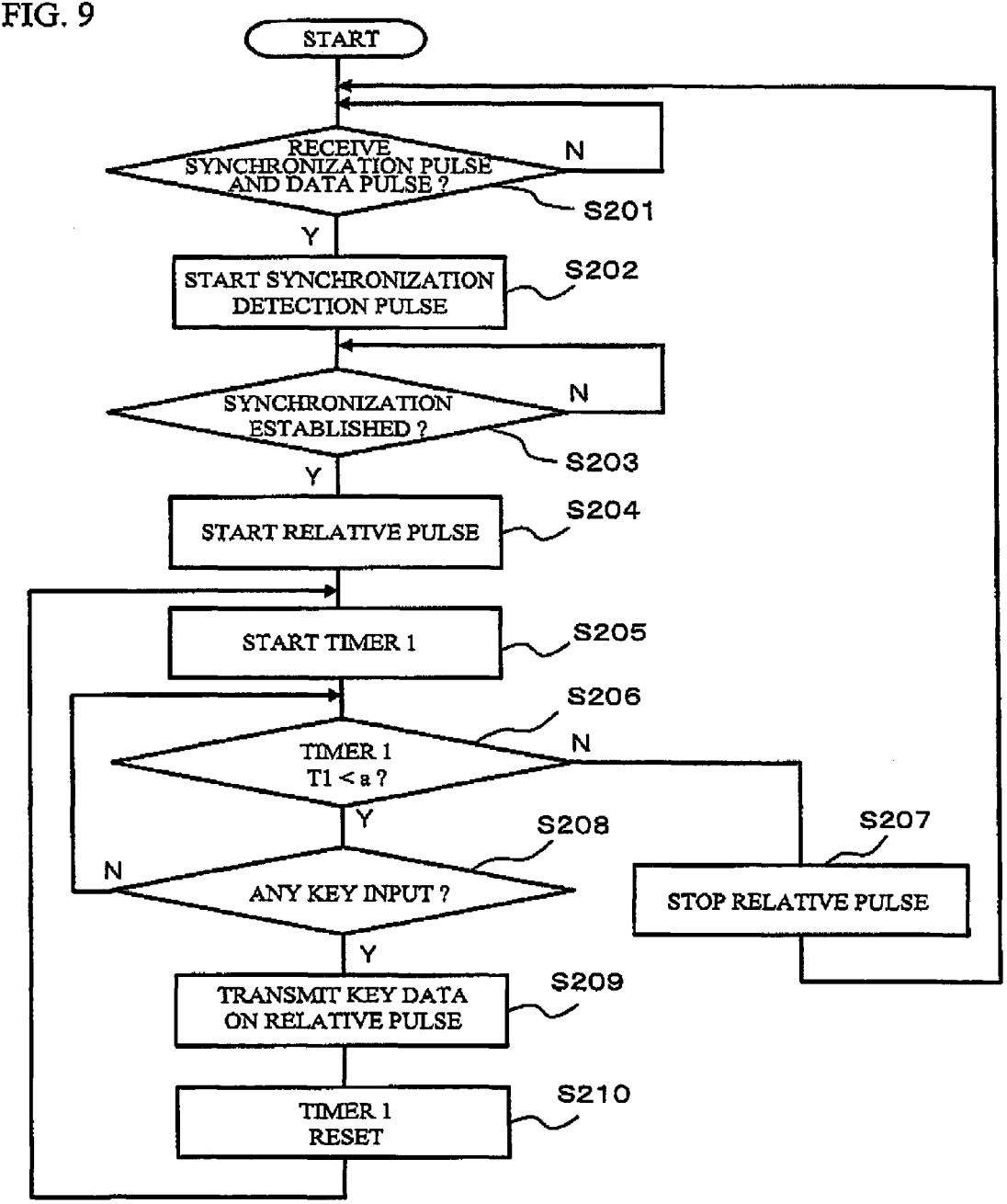
FIG. 9 is a flowchart describing the operation of the receiver.

Next, a description will be given of an operation example of the receiver 40. FIG. 9 is a flowchart describing the operation of the receiver. In step S201, if the CPU 48 receives the synchronization pulse and the data pulse, the CPU 48 starts generating the synchronization detection pulse on the timing generation circuit 50. If the CPU 48 detects the synchronization pulse and the channel requires to be established between the transmitter and the receiver, the channel is established according to the synchronization pulse. In step S203, if the CPU 48 completes the synchronization, the CPU 48 starts generating the relative pulse on the timing generation circuit 50 in step S204. In step S205, the CPU 48 starts the timer 1.

In step S206, if the time T1 of the timer 1 is smaller than a (T1<a is satisfied), that is, if the time T1 of the timer 1 has not passed a given period of time a, the CPU 48 determines whether there is any data input in step S209. If there is a data input, the data is loaded together with the relative pulse generated by the timing generation circuit 50 on the relative circuit 51. In step S210, the CPU 48 resets the timer 1 and goes back to step S205.

In Step S206, if the time T1 of the timer 1 is not smaller than a (T1<a is not satisfied), the relative pulse is stopped generating on the timing generation circuit 50, and go back to step S201.

In accordance with the embodiment of the present invention, the synchronization process is performed on the synchronization pulse having a longer cycle than that of the highly redundant data pulse among the transmit signals. It is thus possible to extract desired signals and establish the synchronization without using the additional external device such as the timing generation device. In addition, it is possible to establish the channel readily with the synchronization pulse, and thereby possible to avoid an interference even if a myriad of ultra wideband radio communication systems such as the UWB exist within a receivable area.

Further, if the receive signal has not been received for a given period of time after the synchronization is established, the relative signal is stopped so as to change to a polling signal having the synchronization pulse. Thus, it is possible to reduce the power consumed, since the relative signal is not generated any longer. This makes it possible to apply the above-mentioned communication device to the system that employs a battery.

The present invention is not limited to the above-mentioned embodiment, and other embodiments, variations and modifications may be made without departing from the scope of the present invention.

The present invention is based on Japanese Patent Application No. 2003-435279 filed on Dec. 26, 2003, the entire disclosure of which is hereby incorporated by reference.

What is claimed is:

1. A communication device that performs wireless communication in an ultra wide band with the use of an impulse radio system, comprising:
    an antenna that receives transmit signals from a transmitter;
    a synchronization pulse detection unit that detects a synchronization pulse composed of one or more pulses that have a longer cycle than that of a data pulse, in the transmit signals received from the antenna;
    a synchronization process unit that performs a synchronization process based on obtaining a correlation with the detected one or more pulses of the synchronization pulse by generating synchronization detection pulses having a period shorter than the detected one or more pulses of the synchronization pulse; and
    a channel establishment unit that establishes a channel for ultra wide band communication based on the detected one or more pulses of the synchronization pulse.

2. A communication device that performs wireless communication in an ultra wide band with the use of an impulse radio system, comprising:
    an antenna that receives transmit signals from a transmitter;
    a synchronization pulse detection unit that detects one or more synchronization pulses included in a pulse train in the transmit signals received from the antenna, the pulse train being determined by a nonlinear function;
    a synchronization process unit that performs a synchronization process based on obtaining a correlation with the detected one or more synchronization pulses included in the pulse train by generating synchronization detection pulses having a period shorter than the detected one or more synchronization pulses included in the pulse train; and
    a channel establishment unit that establishes a channel for ultra wide band communication based on the detected one or more synchronization pluses of the pulse train.

3. The communication device as claimed in claim 1, wherein the channel establishment unit establishes a channel by confirming a difference in cycles of the one or more pluses of the synchronization pulse.

4. The communication device as claimed in claim 1, wherein the channel establishment unit establishes a channel by confirming a difference in cycle patterns of the one or more pulses of the synchronization pulse.

5. The communication device as claimed in claim 1, wherein the channel establishment unit establishes a channel by confirming a difference in a number of pulses of the synchronization pulse.

6. The communication device as claimed in claim 1, wherein the channel establishment unit establishes a channel by confirming a difference in nonlinear functions of the one or more synchronization pulses included in a pulse train that has been determined by a nonlinear function.

7. The communication device as claimed in claim 2, wherein the channel establishment unit establishes a channel by confirming a difference in the nonlinear functions of one or more synchronization pulses included in a pulse train that has been determined by a nonlinear function.

8. The communication device as claimed in claim 1, wherein the synchronization process unit before establishment of a channel selects a narrow band antenna and after establishment of a channel selects a wide band antenna.

9. The communication device as claimed in claim 1, further comprising:
    a control unit that stops generating the synchronization detection pulses as correlative signals to obtain the correlation with the receive signal and starts sending polling signals to wait for the synchronization pulse, if the receive signal has not been received for a given period after a synchronization establishment.

10. A communication method that performs wireless communication in an ultra wide band with the use of an impulse radio system, comprising:
    receiving transmit signals from a transmitter;
    detecting a synchronization pulse composed of one or more pulses that have a longer cycle than that of a data pulse, in the transmit signals received from the antenna;
    performing a synchronization process based on obtaining a correlation with the detected one or more pulses of the synchronization pulse by generating synchronization detection pulses having a period shorter than that of the detected one or more pulses of the synchronization pulse; and
    establishing a channel for ultra wide band communication based on the detected one or more pulses of the synchronization pulse.

11. A communication method that performs wireless communication in an ultra wide band with the use of an impulse radio system, comprising:
    receiving transmit signals from a transmitter;
    detecting one or more synchronization pulses included in a pulse train in the transmit signals that have been received from the antenna, the pulse train having been determined by a nonlinear function;
    performing a synchronization process based on obtaining a correlation with the detected one or more synchronization pulses included in the pulse train by generating synchronization detection pulses having a period shorter than the detected one or more synchronization pulses included in the pulse train; and
    establishing a channel for ultra wide band communication based on the detected one or more synchronization pulses of the pulse train.

* * * * *

UNITED STATES PATENT AND TRADEMARK OFFICE
CERTIFICATE OF CORRECTION

PATENT NO.        : 7,729,405 B2                                        Page 1 of 1
APPLICATION NO.   : 11/019239
DATED             : June 1, 2010
INVENTOR(S)       : Hiroto Inoue et al.

It is certified that error appears in the above-identified patent and that said Letters Patent is hereby corrected as shown below:

Claim 2, Col. 11, line 52, change "pluses" to -- pulses --;

Claim 3, Col. 11, line 55, change "pluses" to -- pulses --.

Signed and Sealed this

Twenty-sixth Day of October, 2010

David J. Kappos
*Director of the United States Patent and Trademark Office*